(12) United States Patent
Iwao et al.

(10) Patent No.: US 7,048,502 B2
(45) Date of Patent: May 23, 2006

(54) FLUID COUPLING

(75) Inventors: Nobuyuki Iwao, Kanagawa (JP); Yasushi Yamamoto, Kanagawa (JP)

(73) Assignee: Isuzu Motors Inc., Tokyo (JP)

( * ) Notice: Subject to any disclaimer, the term of this patent is extended or adjusted under 35 U.S.C. 154(b) by 104 days.

(21) Appl. No.: 10/771,366

(22) Filed: Feb. 5, 2004

(65) Prior Publication Data
US 2004/0154291 A1    Aug. 12, 2004

(30) Foreign Application Priority Data
Feb. 7, 2003    (JP) .............................. 2003-030622

(51) Int. Cl.
    *F01D 5/02* (2006.01)
(52) U.S. Cl. .................. 415/131; 416/180; 416/197 C
(58) Field of Classification Search ................ 416/180, 416/197 C; 415/126, 131
See application file for complete search history.

(56) References Cited

U.S. PATENT DOCUMENTS 2,700,538 A    1/1955    Anderson .................... 264/15
3,312,061 A *  4/1967    Murphy ....................... 60/359

FOREIGN PATENT DOCUMENTS

| DE | 12 64 172 B | 3/1968 |
| DE | 198 07 277 A | 9/1999 |
| GB | 452990 A | 9/1936 |

OTHER PUBLICATIONS

European Search Report dated May 17, 2004.

* cited by examiner

*Primary Examiner*—Ninh H. Nguyen
(74) *Attorney, Agent, or Firm*—James N. Dresser, Esq.

(57) ABSTRACT

A fluid coupling comprising a pump having an annular pump shell with an annular core ring mounted on a pump hub and a plurality of impellers radially arranged in the pump shell, and a turbine arranged facing the pump and having an annular turbine shell with an annular core ring mounted on a turbine hub that can rotate relative to the pump hub and a plurality of runners radially arranged in the turbine shell, wherein the turbine shell is so constituted to slide on the turbine hub in the axial direction, and provision is made of a centrifugal pushing means for pushing the turbine toward the pump by the action of the centrifugal force produced by the rotation of the turbine.

7 Claims, 9 Drawing Sheets

FLUID COUPLING

FIELD OF THE INVENTION

The present invention relates to an improvement on a fluid coupling for transmitting a rotational torque of a prime mover.

DESCRIPTION OF THE RELATED ART

A fluid coupling has heretofore been used as a power transmission coupling for ships, industrial machinery and automobiles. The fluid coupling comprises a pump having an annular pump shell and a plurality of impellers radially arranged in the pump shell, and a turbine that has an annular turbine shell and a plurality of runners radially arranged in the turbine shell and is disposed opposite to the pump, the pump and the turbine being filled with an operation fluid. In the thus constituted fluid coupling, the pump is coupled to a crank shaft (an input shaft as the fluid coupling) of a prime mover which may be, for example, a diesel engine, and the turbine is mounted on the output shaft arranged on same axis line as the input shaft.

Further, there is also used a fluid coupling in which the pump shell and the turbine shell are provided with annular core rings for guiding the operation fluid.

Figure 9:
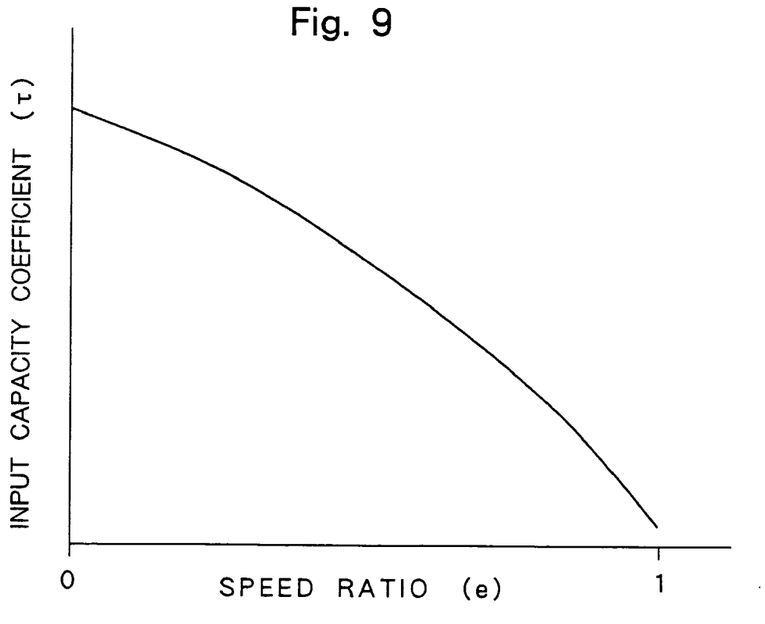
FIG. 9 is a diagram of the characteristic curve of a fluid coupling that has heretofore been used.

FIG. 9 is a diagram illustrating characteristics of a general fluid coupling, and in the diagram, the abscissa represents a speed ratio (e) of the pump and the turbine and the ordinate represents an input capacity coefficient ($\tau$) of the fluid coupling. As will be obvious from FIG. 9, the input capacity coefficient ($\tau$) of the fluid coupling becomes a maximum in a state where the speed ratio (e) of the pump and the turbine is zero (0), i.e., in a state where the pump is rotated but the turbine is at rest. When a drive unit of the vehicle is furnished with the fluid coupling having the above characteristics, a drag torque is inevitably produced in a state where the vehicle is at rest, the engine is in operation and a speed change gear of a transmission is engaged, i.e., in a state where the input shaft is rotated but the output shaft is at a rest. The drag torque generally stands for a transmission torque in a state where the engine is operated at an idling engine speed (e.g., 500 rpm). When the drag torque is great, the engine loses stability to a conspicuous degree during the idling operation and, besides, this unstable rotation becomes a cause of generating abnormal vibration in the drive system. Further, a large drag torque is detrimental to the fuel efficiency during the idling operation.

As a countermeasure to reduce the drag torque, there has been known a technology for arranging a baffle plate between the pump and the turbine.

Figure 10:
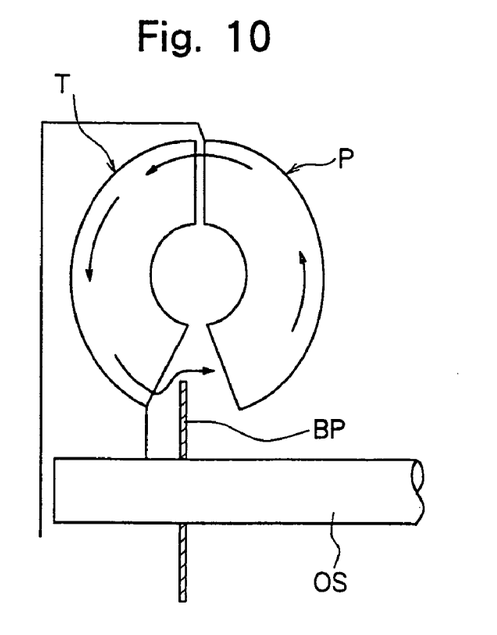
FIG. 10 is a diagram illustrating the flow of operation fluid in one example of a fluid coupling that has heretofore been used.

The countermeasure for reducing the drag torque by arranging the baffle plate will now be described with reference to FIGS. 10 and 11. The fluid coupling shown in FIG. 10 is the one in which an annular baffle plate BP mounted on an output shaft OS is disposed between the pump P and the turbine T. On the other hand, the fluid coupling shown in FIG. 11 is the one in which an annular baffle plate BP is disposed along the outer peripheral portion of the pump P.

Figure 11:
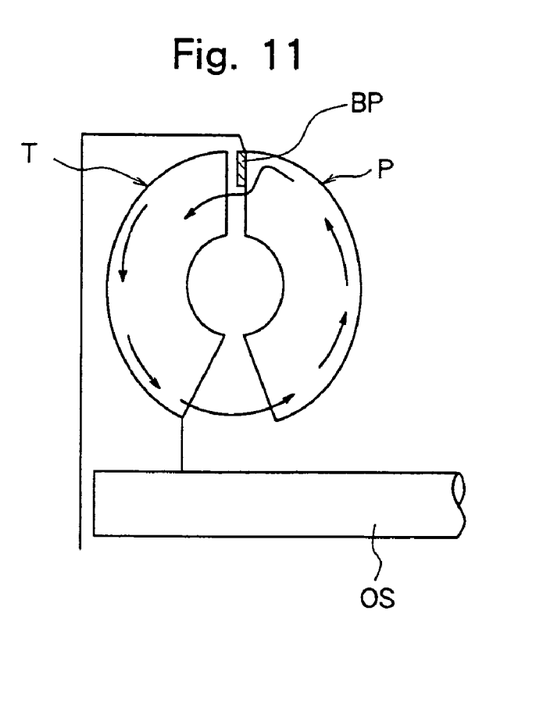
FIG. 11 is a diagram illustrating the flow of operation fluid in another example of a fluid coupling that has heretofore been used.

The fluid couplings shown in FIGS. 10 and 11 employ a fixed baffle plate and have effect to change the characteristics of input capacity coefficient ($\tau$) for the speed ratio (e) of the pump and the turbine, but is not capable of changing the $\tau$-characteristics for the input rotational speed. That is, if $\tau$ (e=0) is lowered to cope with the drag torque, the drag torque during the idling operation becomes lower than that of the case where no baffle plate is provided. In this case, however, the transmission torque, too, becomes small at the time of start, and the vehicle cannot start moving unless the engine rotational speed is considerably increased, and this invites a problem that the fuel efficiency becomes deteriorated thereby. On the other hand, if $\tau$ (e=0) is increased in order to increase the transmission torque at the time of start, the drag torque at the time of idling is also increased thereby causing the fuel efficiency to be deteriorated at the time of idling, though large start torque is obtained. As described above, in the fluid coupling using the fixed baffle plate, there exists a trade-off relationship between the drag torque during the idling and the fuel efficiency, which cannot be solved.

Further, as a countermeasure for reducing the drag torque, there has been disclosed in JP-A 2001-50309 a fluid coupling mounting an annular baffle plate on the inner periphery or the outer periphery of a core ring of the pump shell or of the turbine shell.

When the drive unit of a vehicle is furnished with a fluid coupling, it is desired that the characteristics are such that the transmission torque is reduced during the idling operation where the speed ratio (e) of the pump and the turbine is zero (0), i.e., where the pump is rotated but the turbine is at a halt without sacrificing the transmission torque at the time of start where the engine rotational speed is high, i.e., the rotational speed of the pump is high. According to the fluid coupling disclosed in the above JP-A 2001-50309, the transmission torque or the drag torque can be effectively reduced during the idling operation. However, since the baffle plate is fixed, it inevitably occurs that the transmission torque lowers at the time of start at which the engine rotational speed, i.e., the rotational speed of the pump is high, which is not necessarily satisfactory.

SUMMARY OF THE INVENTION

It is an object of the present invention to provide a fluid coupling capable of effectively reducing the drag torque without sacrificing the transmission torque.

In order to achieve the above object according to the present invention, there is provided a fluid coupling comprising:

a pump having an annular pump shell with an annular core ring mounted on a pump hub and a plurality of impellers radially arranged in the pump shell; and a turbine arranged facing the pump and having an annular turbine shell with an annular core ring mounted on a turbine hub that can rotate relative to the pump hub and a plurality of runners radially arranged in the turbine shell; wherein the turbine shell is so constituted to slide on the turbine hub in the axial direction; and provision is made of a centrifugal pushing means for pushing the turbine toward the pump by the action of the centrifugal force produced by the rotation of the turbine.

The invention further provides a fluid coupling comprising:

a pump having an annular pump shell mounted on a pump hub and a plurality of impellers radially arranged in the pump shell;

a turbine arranged facing the pump and having an annular turbine shell mounted on a turbine hub that can rotate relative to the pump hub and a plurality of runners radially arranged in the turbine shell; and a casing that surrounds the turbine and is coupled to the pump; wherein the turbine shell has through holes formed in the inner peripheral portion thereof and is so constituted to slide on the turbine hub in the axial direction; and provision is made of a centrifugal pushing means for pushing the turbine toward the pump by the action of the centrifugal force produced by the rotation of the turbine.

Other features of the present invention will become obvious from the following description.

DETAILED DESCRIPTION OF THE PREFERRED EMBODIMENTS

Preferred embodiments of the fluid coupling constituted according to the present invention will be described in further detail with reference to the accompanying drawings.

Figure 1:
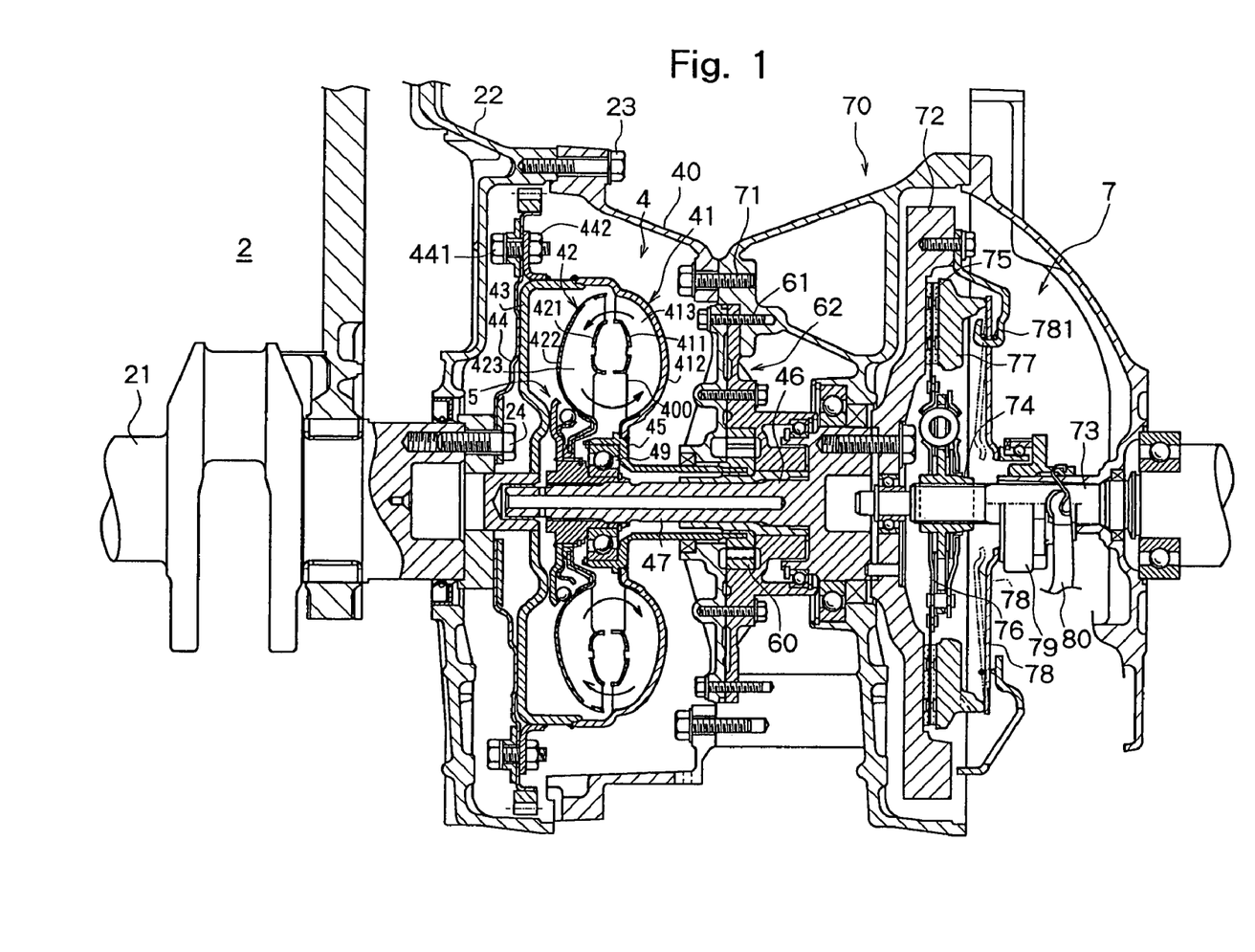
FIG. 1 is a sectional view illustrating a drive unit furnished with a fluid coupling constituted according to an embodiment of the present invention.

FIG. 1 illustrates an embodiment of a drive unit in which a fluid coupling constituted according to the present invention is disposed between an automotive engine and a friction clutch. The drive unit of the illustrated embodiment is constituted by an internal combustion engine 2 which is a prime mover, a fluid coupling 4 constituted according to the present invention, and a friction clutch 7. The internal combustion engine 2 in the illustrated embodiment is a diesel engine, and the side of the pump that will be described later, of the fluid coupling 4 is coupled to an end of a crank shaft 21.

The fluid coupling 4 is arranged in a fluid coupling housing 40 attached by a fastening means such as bolts 23 or the like to a housing 22 that is mounted on a diesel engine 2. The fluid coupling 4 in the illustrated embodiment comprises a pump 41, a turbine 42 arranged facing the pump 41, and a casing 43 that surrounds the turbine 42 and is coupled to the pump 41. The fluid coupling 4 will be described hereinafter with reference to FIG. 1 as well as FIGS. 2 and 3.

Figure 2:
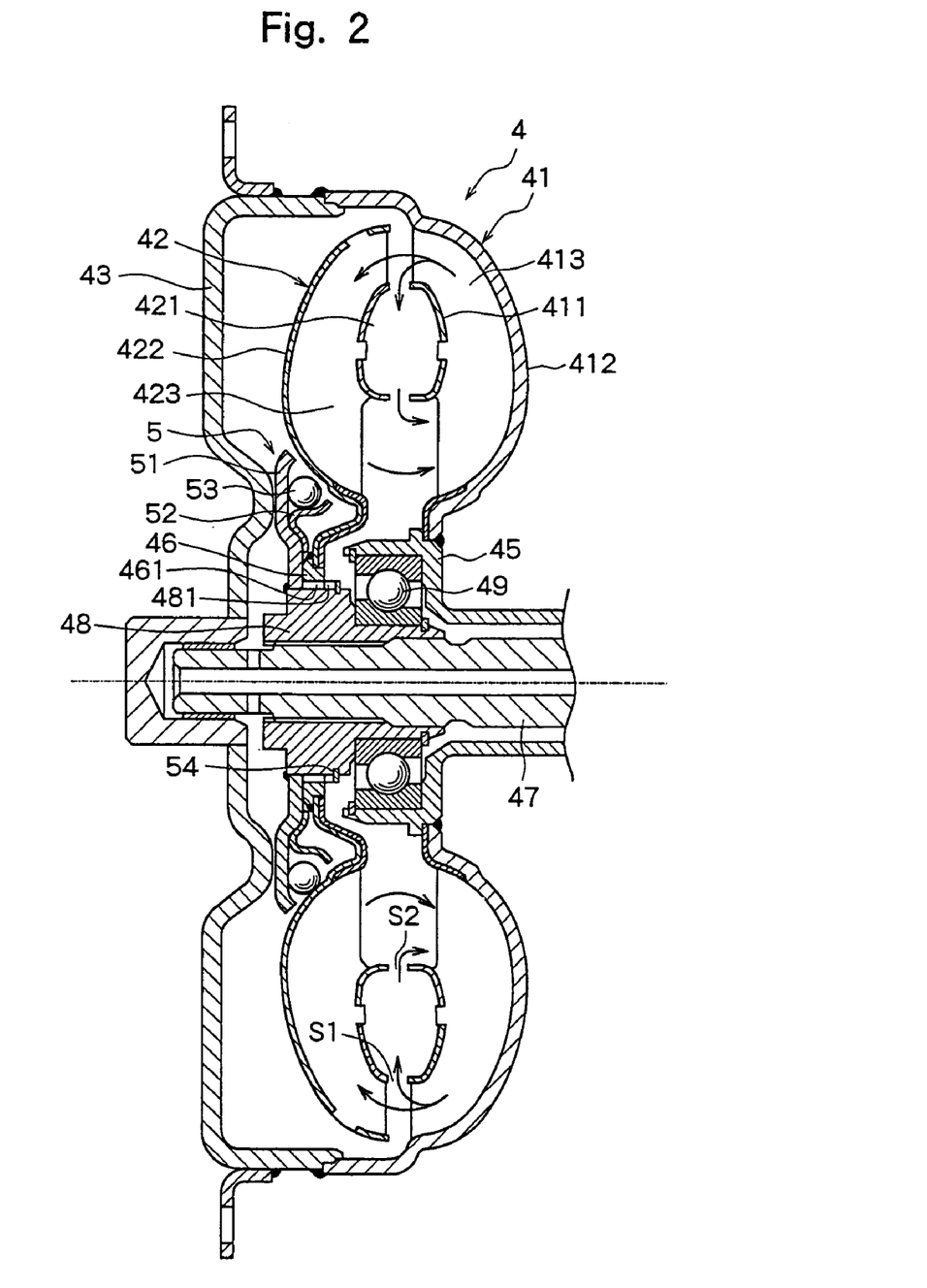
FIG. 2 is a sectional view of a fluid coupling constituted according to an embodiment of the present invention.
Figure 3:
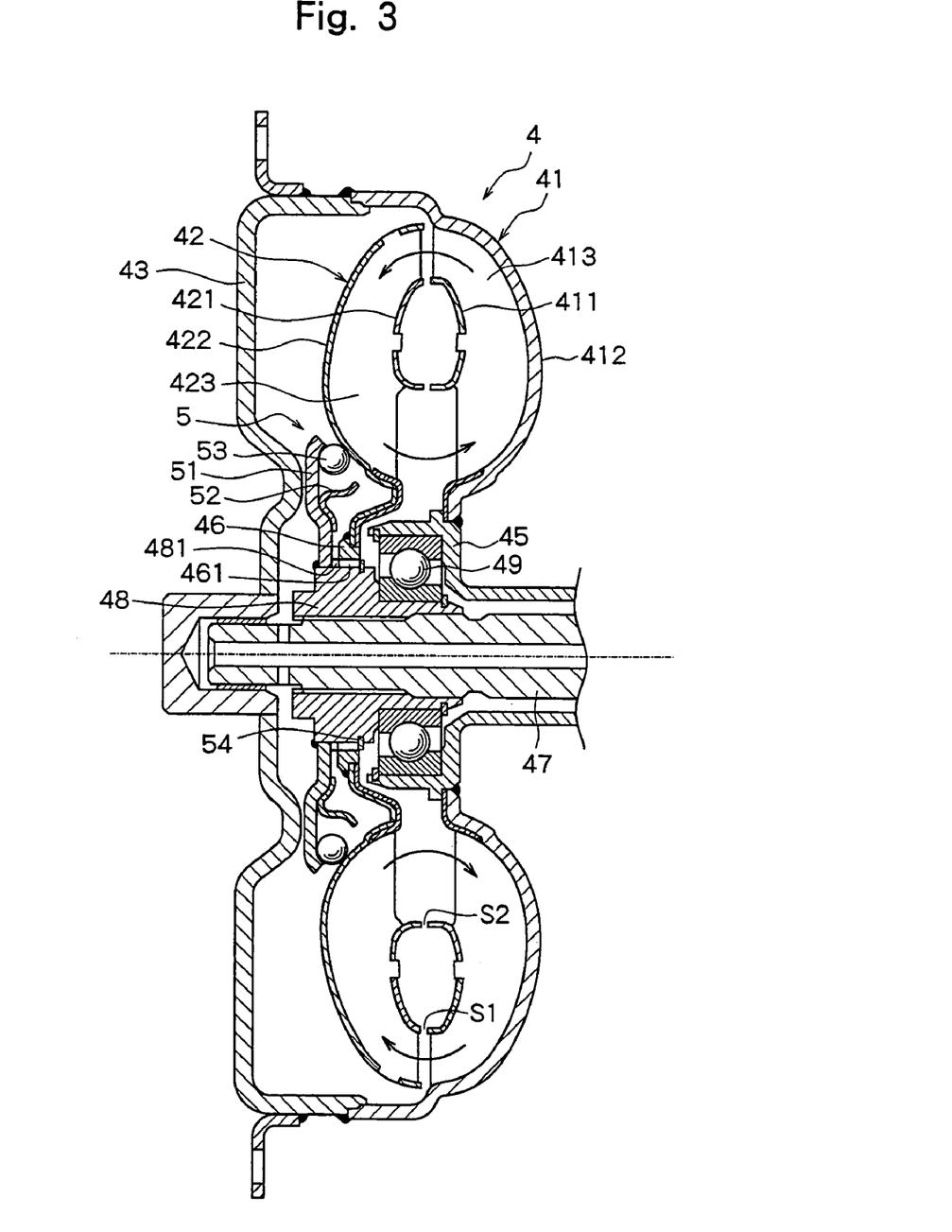
FIG. 3 is a sectional view illustrating a state where a speed ratio (e) of the pump and the turbine is zero in the fluid coupling shown in FIG. 2.

The pump 41 that constitutes the fluid coupling 4 has an annular pump shell 412 with an annular core ring 411, and a plurality of impellers 413 radially arranged in the pump shell 412. The pump shell 412 is mounted on the casing 43 by such a securing means as welding or the like. The casing 43 is mounted, by a fastening means such as bolts 441, nuts 442 or the like, on the outer peripheral portion of a drive plate 44 of which the inner peripheral portion is mounted on the crank shaft 21 by bolts 24. Thus, the pump shell 412 of the pump 41 is coupled to the crank shaft 21 via the casing 43 and the drive plate 44. Therefore, the crank shaft 21 functions as an input shaft of the fluid coupling 4. The thus constituted pump 41 is mounted, at the inner periphery of the pump shell 412, on the pump hub 45 by such a securing means as welding or the like.

The turbine 42 has an annular turbine shell 422 that is arranged facing the pump shell 412 of the pump 41 and has an annular core ring 421, and a plurality of runners 423 radially arranged in the turbine shell 422. An annular boss 46 having internal splines 461 on the inner peripheral surface thereof is mounted on the inner peripheral portion of the turbine shell 422. The boss 46 is arranged on a turbine hub 48 that is spline-fitted to an output shaft 47 arranged on same axis line as the crank shaft 21 as the input shaft, and is allowed to slide in the axial direction. That is, external splines 481 are formed on the outer peripheral surface of the turbine hub 48, and the internal splines 461 of the boss 46 are spline-fitted to the external splines 481, whereby the boss 46 or the turbine shell 422 is mounted on the turbine hub 48 so as to slide in the axial direction. A bearing 49 is arranged between the turbine hub 48 and the pump hub 45. Therefore, the pump hub 45 and the turbine hub 48 are allowed to rotate relative to each other.

The fluid coupling 4 in the illustrated embodiment is equipped with a centrifugal pushing means 5 for pushing the turbine 42 toward the pump 41 by the action of the centrifugal force produced by the rotation of the turbine 42. The centrifugal pushing means 5 comprises a guide member 51 arranged facing the outer surface of the inner peripheral portion of the turbine shell 422 constituting the turbine 42, a holding member 52 mounted on the side surface of the guide member 51 on the side of the turbine shell 422, and a plurality of centrifugal balls 53 working as centrifugal operation members, which are disposed among the holding member 52, the guide member 51 and the outer surface of the inner peripheral portion of the turbine shell 422. The guide member 51 is made of an annular disk, and its inner periphery is attached to the turbine hub 48 by such a securing means as welding or the like while its outer periphery is so formed as to curve toward the side of the turbine 42. The gap between the guide member 51 and the outer surface of the inner circumferential portion of the turbine shell 422 is so constituted to decrease toward the outer circumference thereof. The holding member 52 is formed in an annular shape, and its inner peripheral portion is attached to the guide member 51 by such a securing means as welding or the like and its outer peripheral portion is so formed as to face toward the turbine 42. It is desired that the centrifugal balls 53 are made of a metallic material having a large mass. The gaps from the outer circumferential edge of the guide member 51 and from the outer circumferential edge of the holding member 52 to the corresponding facing outer peripheral surface of the turbine hub 48 are set up to be smaller than the diameter of the centrifugal balls 53, so that the centrifugal balls 53 will not escape through the gap between the holding member 52 or the guide member 51 and the outer surface of the inner peripheral portion of the turbine shell 422. A snap ring 54 is fitted to external splines 481 on the outer periphery of the turbine hub 48 at the right end in the drawing to limit the motion of the turbine 42 toward the right, i.e., toward the side of the pump 41 in the drawing.

Further described with reference to FIG. 1, the fluid coupling 4 of the illustrated embodiment has a hydraulic pump 60 which is arranged in a pump housing 62 attached, by such a securing means as bolts 61 or the like, to a clutch housing 70 that will be described later, of a friction clutch 7 mounted on the fluid coupling housing 40. The hydraulic pump 60 is so constituted as to be rotationally driven by the pump hub 45, and supplies the operation fluid to the pump 41 and to the turbine 42 through a fluid passage that is not shown.

The friction clutch 7 will be described next.

The friction clutch 7 is arranged in a clutch housing 70 mounted on the fluid coupling housing 40 by bolts 71. The friction clutch 7 of the illustrated embodiment comprises a clutch drive plate 72 mounted on the output shaft 47 of the fluid coupling 4, a transmission shaft 73 (in the illustrated embodiment, an input shaft of a transmission that is not shown) arranged on the same axis line as the output shaft 47, a driven plate 76 mounted on a clutch hub 74 spline-fitted to the transmission shaft 73 and mounting a clutch facing 75 on the outer peripheral portion thereof, a pressure plate 77 that pushes the driven plate 76 against the clutch drive plate 72, a diaphragm spring 78 that urges the pressure plate 77 toward the clutch drive plate 72, a release bearing 79 that engages with the inner end portion of the diaphragm spring 78 and operates with an intermediate portion of the diaphragm spring 78 as a fulcrum 781, and a clutch release fork 80 for operating the release bearing 79 in the axial direction. In the thus constituted friction clutch 7 in the illustrated state, the pressure plate 77 is pushed toward the clutch drive plate 72 due to the spring force of the diaphragm spring 78. Therefore, the clutch facing 75 mounted on the driven plate 76 is pushed against the clutch drive plate 72, and the power transmitted from the output shaft 47 of the fluid coupling 4 is transmitted to the transmission shaft 73 through the clutch drive plate 72 and the driven plate 76. To shut off the transmission of power, the hydraulic pressure is fed to a slave cylinder (not shown) to operate the clutch release fork 80 to thereby move the release bearing 79 toward the left in FIG. 1. Then, the diaphragm spring 78 is operated as indicated by a two-dot chain line in the drawing, to release the pushing force exerted on the pressure plate 77, whereby the transmission of power to the driven plate 76 from the clutch drive plate 72 is shut off.

The drive unit equipped with the fluid coupling of the illustrated embodiment is constituted as described above. Described below is the operation thereof.

A driving force generated on the crank shaft 21 (input shaft) of the diesel engine 2 is transmitted to the casing 43 of the fluid coupling 4 via the drive plate 44. The casing 43 and the pump shell 412 of the pump 41 are constituted integrally together and hence, the pump 41 is rotated by the driving force. As the pump 41 rotates, the operation fluid in the pump 41 flows along the impellers 413 toward the outer circumferences thereof due to the centrifugal force, and flows into the side of the turbine 42 as indicated by an arrow. The operation fluid that has flown into the side of the turbine 42, then, flows toward the inner circumferential side thereof and is returned back into the pump 41 as indicated by an arrow. Thus, as the operation fluid in the pump 41 and in the turbine 42 circulates through the pump 41 and the turbine 42, the driving torque on the side of the pump 41 is transmitted to the side of the turbine 42 via the operation fluid. The driving force transmitted to the side of the turbine 42 is transmitted to the output shaft 47 via the turbine shell 422, boss 46 and turbine hub 48, and is further transmitted to the transmission (not shown) through the friction clutch 7.

Next, the torque transmission characteristics of the above-mentioned fluid coupling 4 will be described.

When the engine is at idling operation establishing a state where the speed ratio (e) of the pump 41 and the turbine 42 is zero (0), i.e., the pump 41 is rotated but the turbine 42 is at a halt, a circulating force of the operation fluid in the fluid coupling 4 becomes a maximum. At this moment, since the turbine 42 is at a halt, no centrifugal force acts on the centrifugal balls 53 of the centrifugal pushing means 5. Therefore, the turbine 42 is moved toward the left as shown in FIG. 2 due to the action of the circulating operation fluid. As a result, a gap S1 on the outer circumferential side and a gap S2 on the inner circumferential side increase between the core ring 411 of the pump 41 and the core ring 421 of the turbine 42, and part of the operation fluid circulating as shown by arrows in FIG. 2 enters from the above gap S1 on the outer circumferential side into a chamber formed by the core ring 411 of the pump 41 and the core ring 421 of the turbine 42, and returns back to the side of the pump 41 through the above gap S2 on the inner circumferential side. Therefore, since the operation fluid circulates in decreased amounts from the side of the pump 41 to the side of the turbine 42, the torque transmitted from the pump 41 to the turbine 42 decreases.

As described above, in the state where the speed ratio (e) of the pump 41 and the turbine 42 is zero (0), the circulating force of the operation fluid in the fluid coupling 4 is a maximum. As the speed ratio (e) approaches 1.0, however, the circulating force of the operation fluid in the fluid coupling 4 becomes weak-despite increase of the rotational speed. Accordingly, a force for pushing the turbine 42 toward the left, which is produced by a circulating force of the operation fluid, decreases. When the turbine 42 rotates, on the other hand, a centrifugal force acts on the centrifugal balls 53 of the centrifugal pushing means 5, and the centrifugal balls 53 move toward the outer circumference while being guided by the side surface of the guide member 51. As a result, the centrifugal balls 53 push the outer surface of the turbine shell 422 as illustrated in FIG. 3, and work to move the turbine 42 toward the right, i.e., toward the side of the pump 41 until the boss 46 comes in contact with the snap ring 54. Therefore, as the gaps S1 and S2 between the core ring 411 of the pump 41 and the core ring 421 of the turbine 42 gradually decrease, the amount of the operation fluid returning back to the side of the pump 41 through the chamber formed by the core ring 411 of the pump 41 and the core ring 421 of the turbine 42 gradually decrease, whereby the transmission torque increases.

Figure 8:
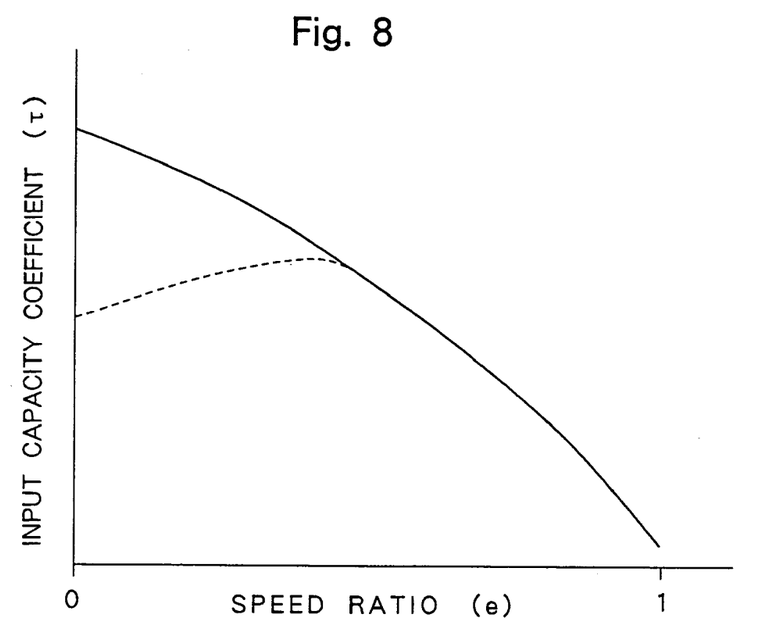
FIG. 8 is a diagram of the characteristic curve of the fluid coupling constituted according to the present invention.

Characteristics of the above-mentioned fluid coupling 4 will be described with reference to a diagram of characteristic curve of FIG. 8 in which the abscissa represents the speed ratio (e) of the pump and the turbine and the ordinate represents the input capacity coefficient ($\tau$) of the fluid coupling. In FIG. 8, a solid line represents the characteristics of a conventional fluid coupling in which the turbine 42 is secured to a position shown in FIG. 3, and a broken line represents the characteristics of the above-mentioned fluid coupling 4. When the fluid coupling 4 of the embodiment illustrated in the drawing is in a state where the speed ratio (e) of the pump 41 and the turbine 42 is zero (0), the operation fluid circulates in decreased amounts from the side of the pump 41 to the side of the turbine 42 as described above and hence, its input capacity coefficient ($\tau$) greatly decreases as compared to that of the conventional fluid coupling represented by the solid line, as shown by the broken line in FIG. 8. It is therefore made possible to greatly decrease the drag torque during the idling operation of the engine in a state where the pump 41 is rotated but the turbine 42 is at a halt. As the speed ratio (e) of the pump 4 and the turbine 42 approaches 1.0, on the other hand, the circulating force of the operation fluid in the fluid coupling 4 becomes weak even though the rotational speed is increased. As the turbine 42 is rotated, on the other hand, the centrifugal balls 53 move toward the outer circumferential direction due to the centrifugal force acting on the centrifugal balls 53 to cause the turbine 42 to move toward the side of the pump 41. Therefore, the gaps S1 and S2 gradually decrease between the core ring 411 of the pump 41 and the core ring 421 of the turbine 42, and the amount of the operation fluid returning back to the side of the pump 41 through the chamber formed by the core ring 411 of the pump 41 and the core ring 421 of the turbine 42 gradually decreases. As represented by the broken line in FIG. 8, therefore, the input capacity coefficient (τ) is gradually brought into agreement with the characteristics, represented by the solid line, of the fluid coupling having the fixed turbine 42. Therefore, the transmission torque is not lowered in the state where the speed ratio (e) of the pump 41 and the turbine 42 is close to 1.0.

The fluid coupling constituted according to another embodiment of the invention will be described next with reference to FIGS. 4 and 5. In the embodiment illustrated in FIGS. 4 and 5, the same members as those of the embodiment illustrated in FIGS. 2 and 3 are denoted by the same reference numerals but their description is not repeated.

Figure 4:
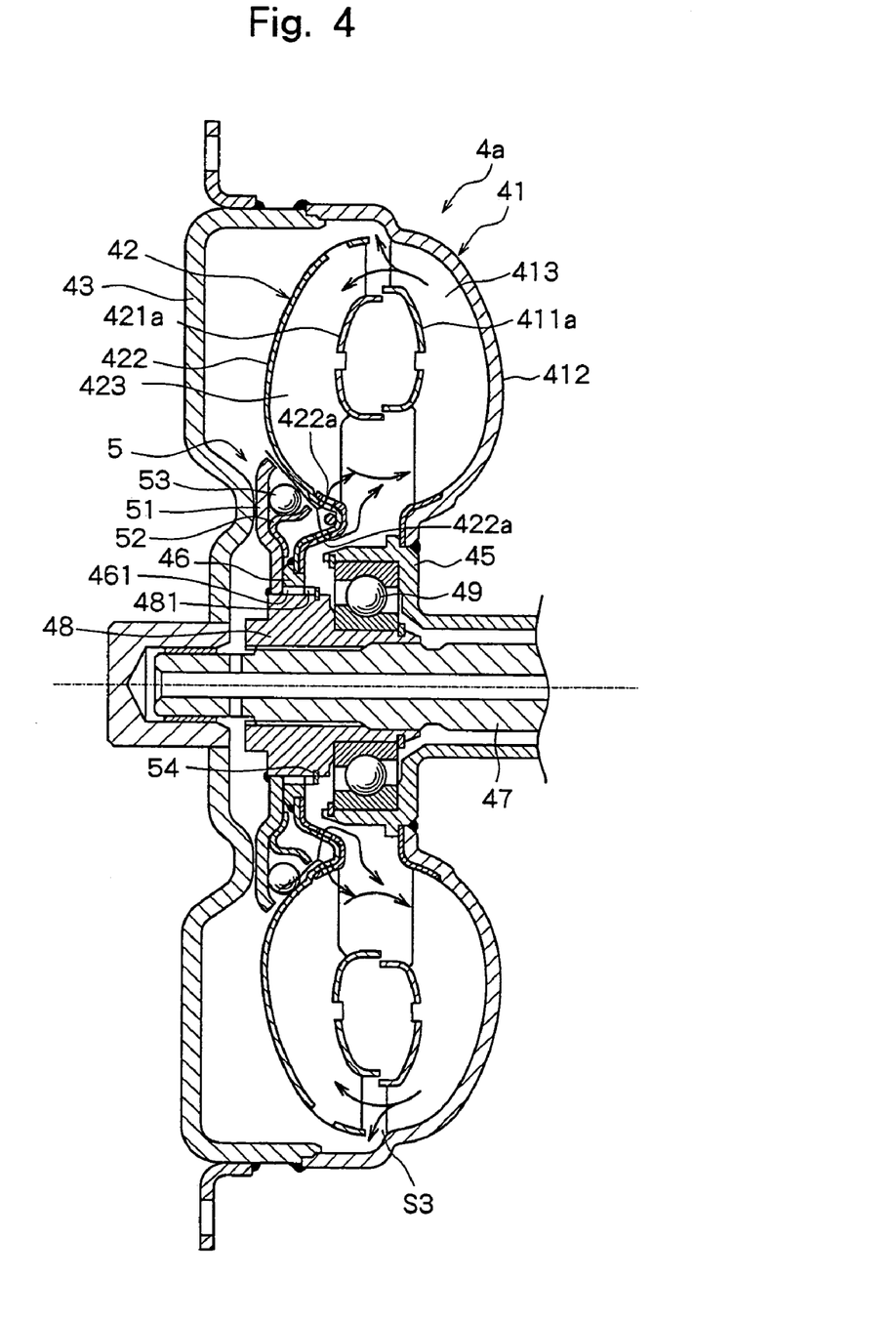
FIG. 4 is a sectional view illustrating the fluid coupling constituted according to another embodiment of the present invention.
Figure 5:
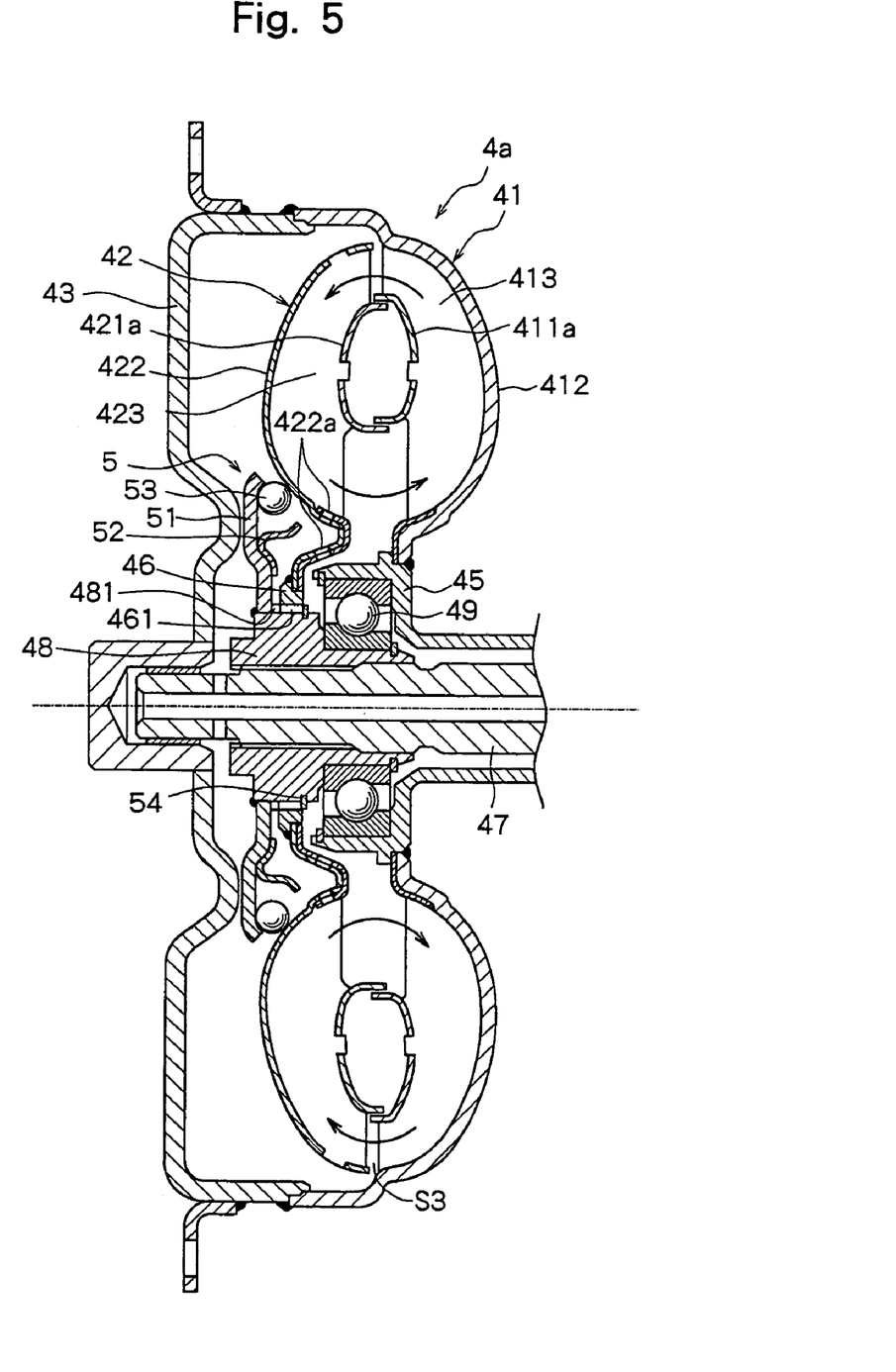
FIG. 5 is a sectional view illustrating a state where a speed ratio (e) of the pump and the turbine is zero in the fluid coupling shown in FIG. 4.

In the embodiment illustrated in FIGS. 4 and 5, the invention is applied to the fluid coupling 4*a* in which the outer circumferential edge portion and the inner circumferential edge portion of the core ring 411*a* of the pump 41 are each overlapped with the outer circumferential edge portion and the inner circumferential edge of the core ring 421*a* of the turbine 42. In the embodiment illustrated in FIGS. 4 and 5, a plurality of flow holes 422*a* are formed in the inner peripheral portion of the turbine shell 422 constituting the turbine 42. When the engine is at idling operation establishing a state where the speed ratio (e) of the pump 41 and the turbine 42 is zero (0), i.e., the pump 41 is rotated but the turbine 42 is at a halt, the circulating force of the operation fluid in the thus constituted fluid coupling 4*a* becomes a maximum, like that of the above-mentioned embodiment illustrated in FIGS. 2 and 3. At this moment, since the turbine 42 is at a halt, no centrifugal force acts on the centrifugal balls 53 of the centrifugal pushing means 5. Due to the action of the circulating operation fluid, therefore, the turbine 42 is moved toward the left as shown in FIG. 4. As a result, a gap between the pump shell 412 and the turbine shell 422 increases. Here, however, since the outer circumferential edge portion and the inner circumferential edge portion of the core ring 411*a* of the pump 41 are each overlapped with the outer circumferential edge portion and the inner circumferential edge portion of the core ring 421*a* of the turbine 42, no gap is formed between the two core rings, and the operation fluid circulating in the fluid coupling 4*a* does not pass through the chamber formed by the two core rings. Therefore, the operation fluid circulating in the fluid coupling 4*a* partly flows out to the chamber formed by the turbine shell 422 and the casing 43 through a gap S3 between the pump shell 412 and the outer circumferential edge of the turbine shell 422 as indicated by arrows in FIG. 5, flows into the fluid coupling 4*a* through the flow holes 422*a* formed in the inner peripheral portion of the turbine shell 422, and returns back to the side of the pump 41. Therefore, the amount of the operation fluid circulating from the side of the pump 41 to the side of the turbine 42 decreases and hence, the transmission torque transmitted from the pump 41 to the turbine 42 lowers.

As the speed ratio (e) of the pump 41 and the turbine 42 approaches 1.0, on the other hand, the circulating force of the operation fluid in the fluid coupling 4*a* becomes weak even though the rotational speed increases. Therefore, a force for pushing the turbine 42 toward the left, which is produced by a circulating force of the operation fluid, decreases, like in the above-mentioned embodiment illustrated in FIGS. 2 and 3. As the turbine 42 is rotated, on the other hand, the centrifugal force acts on the centrifugal balls 53 of the centrifugal pushing means 5, and the centrifugal balls 53 move toward the outer circumference while being guided by the side surface of the guide member 51. As a result, the centrifugal balls 53 push the outer surface of the turbine shell 422 as shown in FIG. 5, and work to move the turbine 42 toward the right, i.e., toward the side of the pump 41 until the boss 46 comes in contact with the snap ring 54. Therefore, as the gap between the pump shell 412 and the turbine shell 422 gradually decreases, the amount of the operation fluid flowing out from the gap S3 between the pump shell 412 and the outer peripheral edge of the turbine shell 422 gradually decreases, whereby the transmission torque increases. The fluid coupling 4*a* of the embodiment illustrated in FIGS. 4 and 5 operates as described above, and has characteristics as shown by the broken line in FIG. 8, like the embodiment described above with reference to FIGS. 2 and 3. Therefore, the fluid coupling 4*a* of the embodiment illustrated in FIGS. 4 and 5 makes it possible to effectively lower the drag torque without decreasing the transmission torque.

The fluid coupling constituted according to a further embodiment of the invention will be described next with reference to FIGS. 6 and 7. In the embodiment illustrated in FIGS. 6 and 7, the same members as those of the above embodiments are denoted by the same reference numerals but their description is not repeated.

Figure 6:
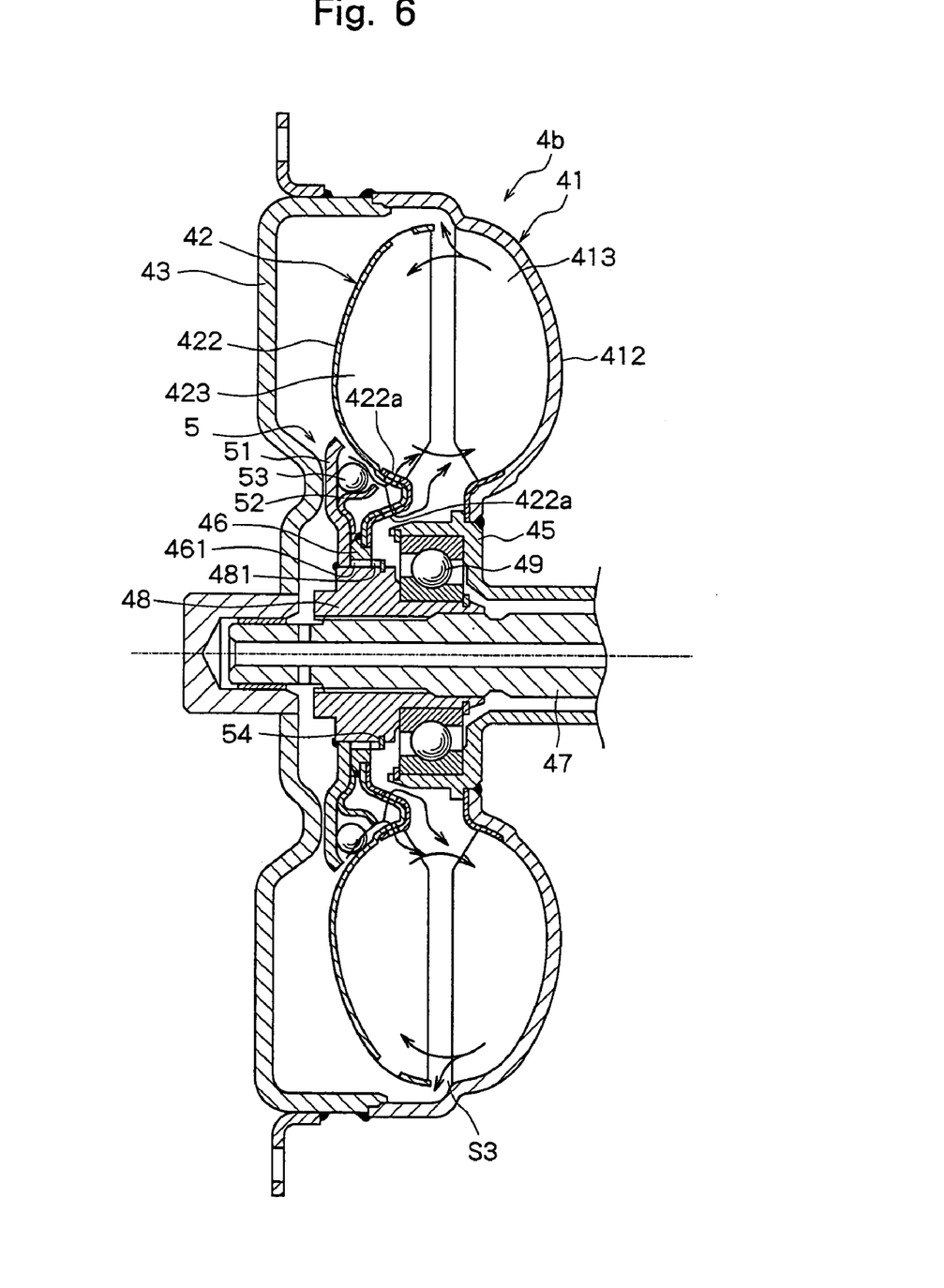
FIG. 6 is a sectional view illustrating the fluid coupling constituted according to a further embodiment of the present invention.
Figure 7:
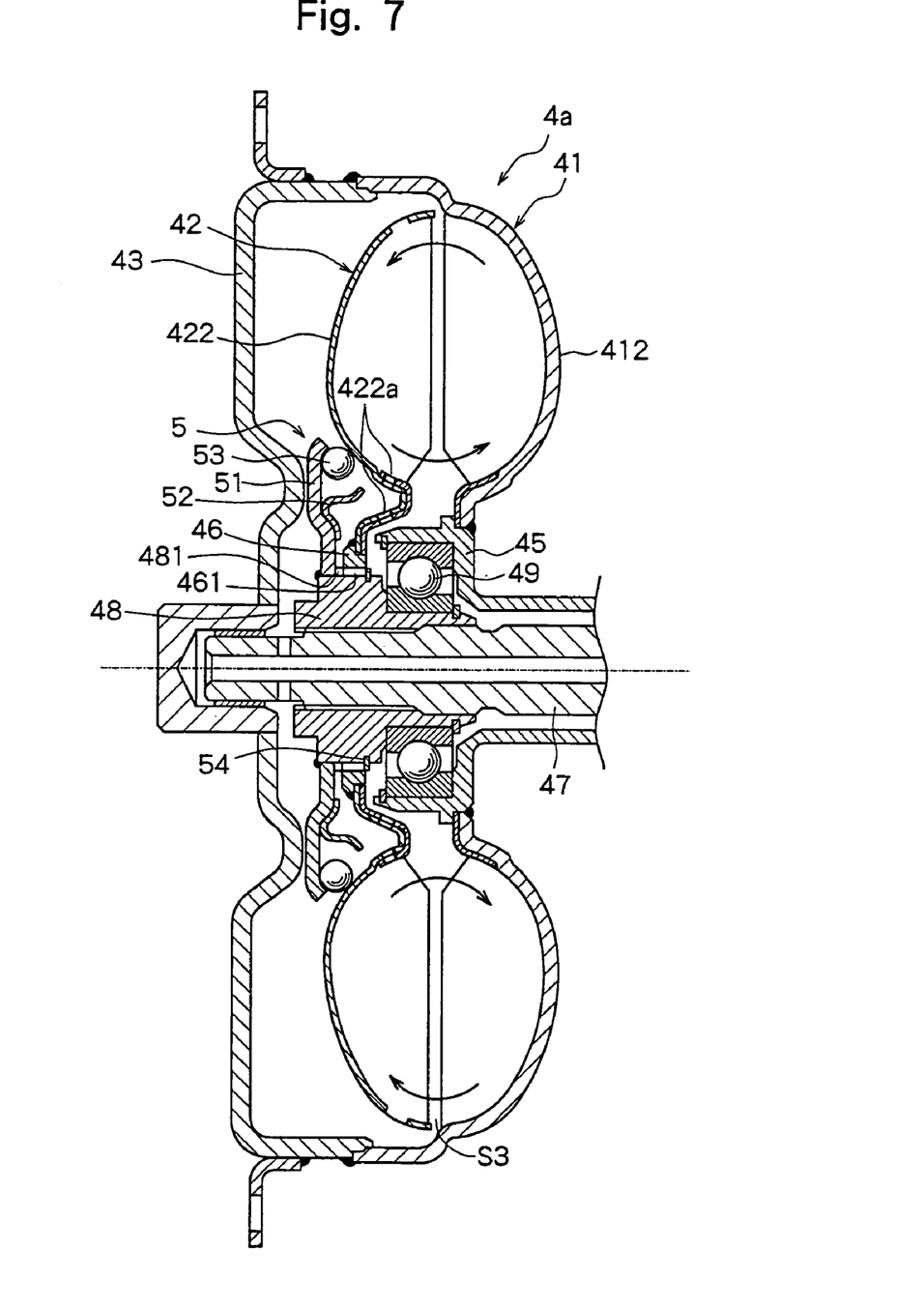
FIG. 7 is a sectional view illustrating a state where a speed ratio (e) of the pump and the turbine is zero in the fluid coupling shown in FIG. 6.

In the embodiment illustrated in FIGS. 6 and 7, the invention is applied to the fluid coupling 4*b* comprising the pump 41 and the turbine 42, both having no core ring. A plurality of flow holes 422*a* are formed in the inner peripheral portion of the turbine shell 422 constituting the turbine 42, like in the embodiment illustrated in FIGS. 4 and 5.

When the engine is at idling operation establishing a state where the speed ratio (e) of the pump 41 and the turbine 42 is zero (0), i.e., the pump 41 is rotated but the turbine 42 is at a halt, the circulating force of the operation fluid in the thus constituted fluid coupling 4*b* becomes a maximum, like that of the above-mentioned embodiments. At this moment, since the turbine 42 is at a halt, no centrifugal force acts on the centrifugal balls 53 of the centrifugal pushing means 5. Due to the action of the circulating operation fluid, therefore, the turbine 42 is moved toward the left as shown in FIG. 6. As a result, a gap between the pump shell 412 and the turbine shell 422 increases. Consequently, the operation fluid circulating in the fluid coupling 4*b* partly flows out to the chamber formed by the turbine shell 422 and the casing 43 from the gap S3 between the pump shell 412 and the outer peripheral edge of the turbine shell 422 as indicated by arrows in FIG. 6, flows into the fluid coupling 4*b* through the flow holes 422*a* formed in the inner peripheral portion of the turbine shell 422, and returns back to the side of the pump 41. Therefore, the amount of the operation fluid circulating from the side of the pump 41 to the side of the turbine 42 decreases and hence, the transmission torque from the pump 41 to the turbine 42 lowers.

As the speed ratio (e) of the pump 41 and the turbine 42 approaches 1.0, on the other hand, the circulating force of the operation fluid in the fluid coupling 4b becomes weak even though the rotational speed increases. Therefore, a force for pushing the turbine 42 toward the left, which is produced by a circulating force of the operation fluid, decreases, like in the above-mentioned embodiments. As the turbine 42 is rotated, on the other hand, the centrifugal force acts on the centrifugal balls 53 of the centrifugal pushing means 5, and the centrifugal balls 53 moves toward the outer circumference while being guided by the side surface of the guide member 51. As a result, the centrifugal balls 53 push the outer surface of the turbine shell 422 as shown in FIG. 7, and work to move the turbine 42 toward the right, i.e., toward the side of the pump 41 until the boss 46 comes in contact with the snap ring 53. As a result, the gap between the pump shell 412 and the turbine shell 422 gradually decreases, and the operation fluid flowing out from the gap S3 between the pump shell 412 and the outer peripheral edge of the turbine shell 422 gradually decreases. Therefore, the transmission torque increases. Since the fluid coupling 4b of the embodiment illustrated in FIGS. 6 and 7 operates as described above, it has characteristics as shown by the broken line in FIG. 8, like the embodiments described above. Therefore, the fluid coupling 4b of the embodiment illustrated in FIGS. 6 and 7 makes it possible to effectively lower the drag torque without decreasing the transmission torque.

Being constituted as described above, the fluid coupling of the present invention makes it possible to effectively decrease the drag torque by lowering the transmission torque from the pump to the turbine in a state where the speed ratio (e) of the pump and the turbine is zero (0), i.e., in a state where the pump is rotated but the turbine is at a halt without sacrificing the transmission torque in a state where the speed ratio (e) of the pump and the turbine is close to 1.0.

We claim:

1. A fluid coupling comprising:
   a pump comprising an annular pump shell, an annular pump core ring, a pump hub having said pump shell and pump core ring mounted thereon, and a plurality of impellers radially mounted in said pump shell;
   a turbine facing said pump with a gap therebetween, said turbine comprising an annular turbine shell, an annular turbine core ring, a turbine hub rotatable relative to said pump hub, and a plurality of runners radially mounted in said turbine shell, said turbine shell and turbine core ring being slidably mounted on said turbine hub, permitting said turbine shell, said turbine core ring, and said runners to slide in and axial direction on said turbine hub; and
   a centrifugal pushing device for pushing said turbine shell, said turbine core ring, and said runners axially on said turbine hub toward said pump by centrifugal force produced during rotation of said turbine, the gap between said pump and said turbine being a maximum when said turbine is not rotating and decreasing from that maximum due to the pushing as said turbine rotates, until reaching a minimum.

2. A fluid coupling according to claim 1, wherein said centrifugal pushing device comprises an annular guide member facing the outer surface of the inner peripheral portion of said turbine shell and mounted on said turbine hub, a holding member mounted to the side surface of said guide member on the side of said turbine shell, and a plurality of centrifugal operation members disposed among said holding member, said guide member and the outer surface of the inner peripheral portion of said turbine shell.

3. A fluid coupling according to claim 2, wherein said centrifugal operation members comprise balls.

4. A fluid coupling comprising:
   a pump comprising an annular pump shell, a pump hub having said pump shell mounted thereon, and a plurality of impellers radially mounted in said pump shell;
   a turbine facing said pump and comprising an annular turbine shell, a turbine hub rotatable relative to said pump hub, and a plurality of runners radially mounted in said turbine shell, said turbine shell being slidably mounted on said turbine hub, permitting said turbine shell and said runners to slide in an axial direction on said turbine hub, said turbine shell having flow holes through the inner peripheral portion thereof;
   a casing surrounding said turbine and coupled to said pump; and
   a centrifugal pushing device for pushing said turbine shell and said runners axially on said turbine hub toward said pump by centrifugal force produced during rotation of said turbine.

5. A fluid coupling according to claim 4, wherein said centrifugal pushing device comprises an annular guide member facing the outer surface of the inner peripheral portion of said turbine shell and mounted on said turbine hub, a holding member mounted to the side surface of said guide member on the side of said turbine shell, and a plurality of centrifugal operation members disposed among said holding member, said guide member and the outer surface of the inner peripheral portion of said turbine shell.

6. A fluid coupling according to claim 5, wherein said centrifugal operation members comprise balls.

7. A fluid coupling according to claim 4, further comprising an annular pump core ring within said pump shell, and an annular turbine core ring within said turbine shell, the outer circumferential edge portion and the inner circumferential edge portion of the two core rings overlapping each other.

* * * * *